United States Patent
Oestermeyer et al.

(10) Patent No.: US 8,060,264 B2
(45) Date of Patent: Nov. 15, 2011

(54) SYSTEM FOR MONITORING RAILROAD CARS

(75) Inventors: David A. Oestermeyer, Downers Grove, IL (US); Alex V. Degutis, East Chicago, IN (US); Peter Gubricky, Crest Hill, IL (US); Michael S. Ryan, Darien, IL (US); Clayton Strand, Bolingbrook, IL (US); William R. Borowski, Palos Park, IL (US); Andy Borowski, Palos Park, IL (US); James M. McLaughlin, Monee, IL (US)

(73) Assignee: Salco Products Inc., Lemont, IL (US)

( * ) Notice: Subject to any disclaimer, the term of this patent is extended or adjusted under 35 U.S.C. 154(b) by 1250 days.

(21) Appl. No.: 11/734,859

(22) Filed: Apr. 13, 2007

(65) Prior Publication Data

US 2008/0252515 A1    Oct. 16, 2008

(51) Int. Cl.
*G05D 1/00* (2006.01)

(52) U.S. Cl. ............... 701/19; 105/248; 105/377.01; 220/314; 220/324; 414/203; 414/303; 296/100.02; 296/257

(58) Field of Classification Search .............. 701/19; 340/168; 342/357.01; 188/1.11; 220/314, 220/324, 367.1, 371, 374, 372, 378; 292/256.5, 292/259 R, 100.02, 257; 414/203, 303, 329, 414/389; 16/235, 231; 277/637; 52/45; 49/231

See application file for complete search history.

(56) References Cited

U.S. PATENT DOCUMENTS

| | | | | |
|---|---|---|---|---|
| 4,335,820 A * | 6/1982 | Gramera | .................. | 213/75 TC |
| 4,388,873 A * | 6/1983 | Carleton et al. | ......... | 105/377.11 |
| 4,461,219 A * | 7/1984 | Bateson | .................. | 105/377.07 |
| 4,714,142 A | 12/1987 | Shepherd | | |
| 4,854,076 A * | 8/1989 | Sieben et al. | .................. | 49/280 |
| 4,897,642 A | 1/1990 | DiLullo et al. | | |
| 5,025,253 A | 6/1991 | DiLullo et al. | | |
| 5,064,089 A * | 11/1991 | Schultz | ........................ | 220/372 |
| 5,145,131 A | 9/1992 | Franke | | |
| 5,415,583 A * | 5/1995 | Brandt, Jr. | ...................... | 454/61 |
| 5,622,117 A * | 4/1997 | Burian et al. | ............ | 105/377.07 |
| 5,738,396 A * | 4/1998 | Oestermeyer et al. | ..... | 292/256.5 |
| 5,845,230 A | 12/1998 | Lamberson | | |
| 5,955,942 A | 9/1999 | Slifkin et al. | | |
| 5,960,980 A * | 10/1999 | Burke et al. | .................. | 220/325 |
| 6,085,664 A * | 7/2000 | Early | ....................... | 105/377.07 |
| 6,237,722 B1 * | 5/2001 | Hammond et al. | ...... | 188/1.11 R |
| 6,301,531 B1 | 10/2001 | Pierro et al. | | |
| 6,373,403 B1 | 4/2002 | Korver et al. | | |
| 6,385,942 B1 * | 5/2002 | Grossman et al. | ........... | 52/798.1 |

(Continued)

*Primary Examiner* — James Trammell
*Assistant Examiner* — McDieunel Marc
(74) *Attorney, Agent, or Firm* — Leydig, Voit & Mayer, Ltd.

(57) ABSTRACT

A system for monitoring railroad cars comprising a hatch cover assembly including a cover body, a sensor, a wireless transmitter for transmitting data received from the sensor, a wireless receiver for receiving the data from the wireless transmitter, and a satellite transmitter for transmitting the data to a satellite. The wireless receiver and the satellite transmitter are attached to the hatch cover assembly. In one embodiment, the sensor is a pressure sensor having a sensing unit situated in the plenum of a vented hatch cover. In another embodiment, the sensor is an air flow sensor having a sensing unit situated in the plenum of a vented hatch cover. In another embodiment, the sensor is a chain tension sensor attached to a handbrake chain. In another embodiment, the sensor is a hatch cover position attached to the hatch cover assembly.

20 Claims, 14 Drawing Sheets

U.S. PATENT DOCUMENTS

| | | | |
|---|---|---|---|
| 6,494,338 B1 * | 12/2002 | Schultz | 220/328 |
| 6,587,041 B1 | 7/2003 | Brown, Jr. | |
| 6,631,322 B1 * | 10/2003 | Arthur et al. | 701/211 |
| 7,035,856 B1 | 4/2006 | Morimoto | |
| 7,073,753 B2 | 7/2006 | Root et al. | |
| 7,099,770 B2 | 8/2006 | Naden et al. | |
| 7,102,564 B2 | 9/2006 | Huston et al. | |
| 7,152,347 B2 * | 12/2006 | Herzog et al. | 37/195 |
| 7,554,442 B2 * | 6/2009 | Twitchell, Jr. | 340/539.26 |
| 7,688,218 B2 * | 3/2010 | LeFebvre et al. | 340/682 |
| 7,703,630 B2 * | 4/2010 | Degutis et al. | 220/371 |
| 7,715,956 B2 * | 5/2010 | Bryant | 701/19 |
| 7,783,507 B2 * | 8/2010 | Schick et al. | 705/7 |
| 2001/0017095 A1 * | 8/2001 | Shaddle | 105/377.07 |
| 2005/0110281 A1 * | 5/2005 | Dykstra | 292/260 |
| 2005/0127690 A1 * | 6/2005 | Chesser et al. | 292/307 R |
| 2008/0146136 A1 * | 6/2008 | Degutis et al. | 454/83 |
| 2009/0254277 A1 | 10/2009 | Davey | |

* cited by examiner

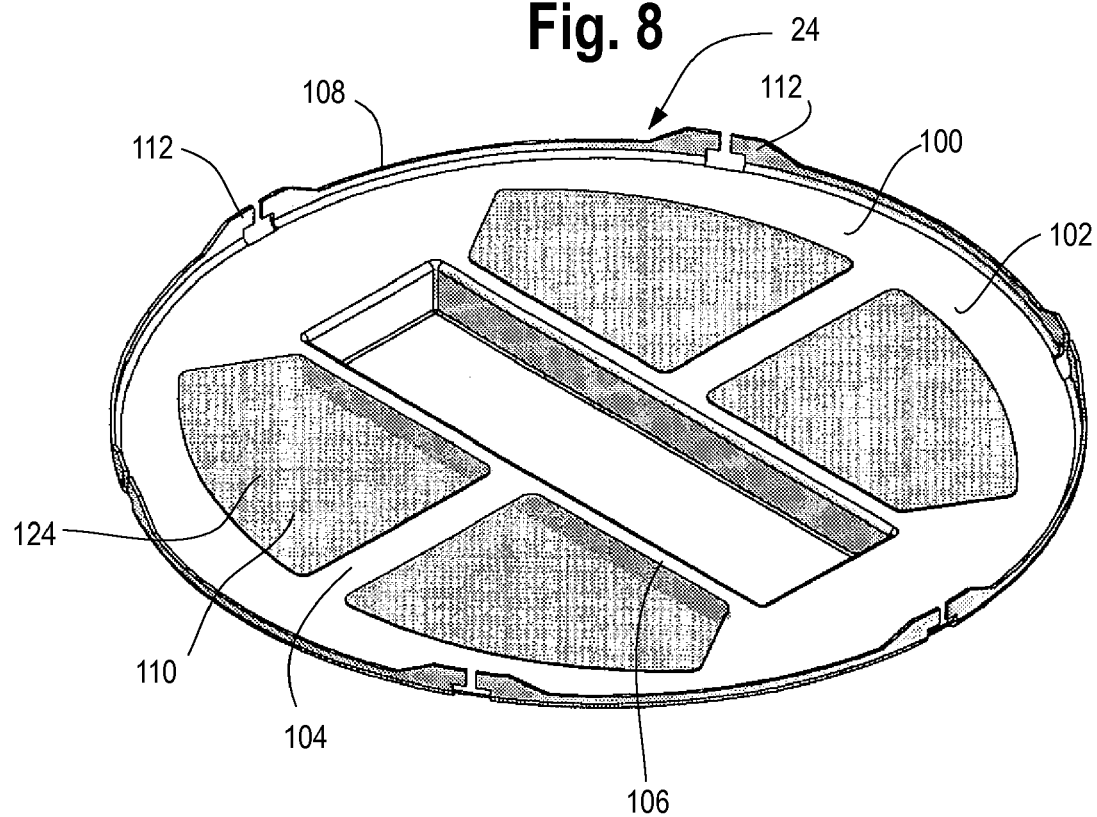

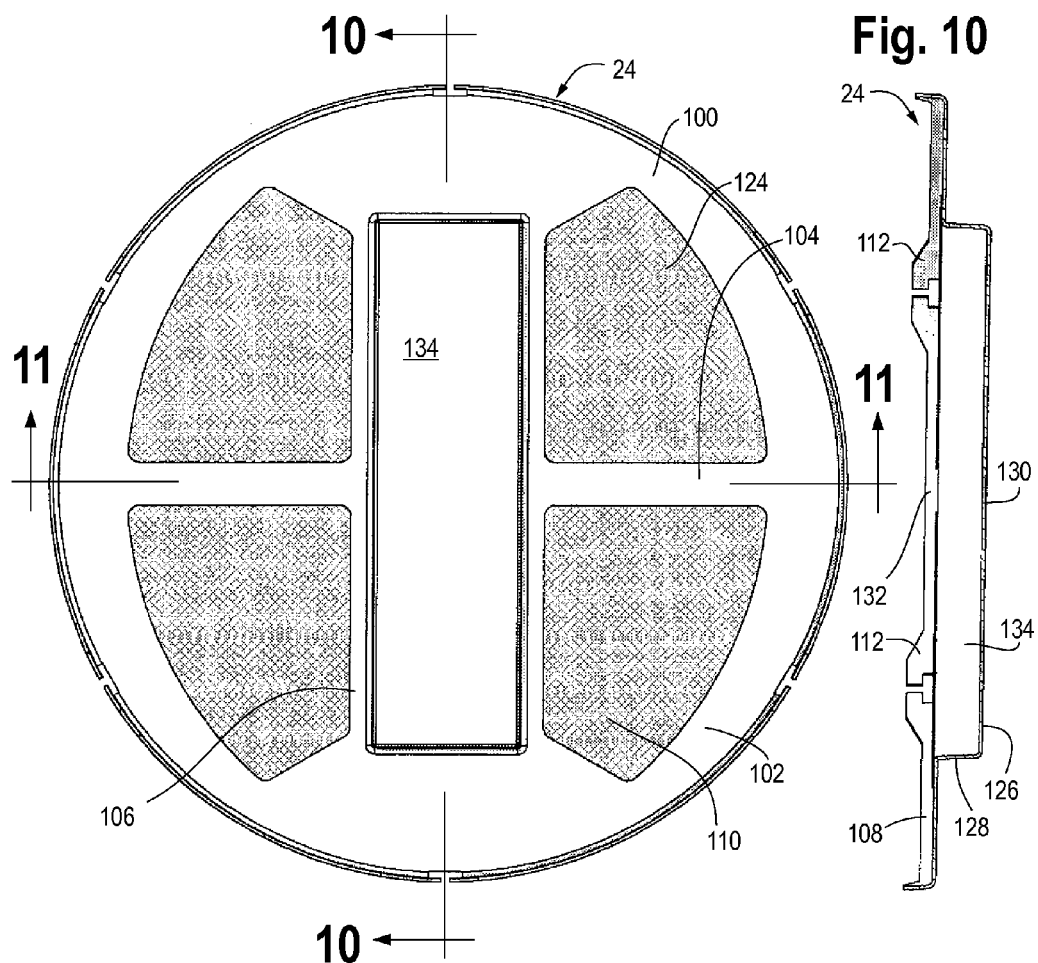
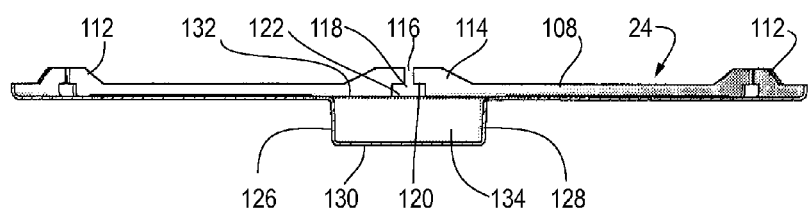

SYSTEM FOR MONITORING RAILROAD CARS

BACKGROUND OF THE INVENTION

The present invention relates to systems for monitoring railroad cars. More specifically, it relates to a system for monitoring railroad cars that includes a satellite transmitter.

Railroad hopper cars carrying bulk particulate matter, such as grain or plastic pellets, are typically unloaded by applying a vacuum conveying line to an outlet gate positioned at the bottom of each car compartment. The primary air flow for the vacuum conveying line is obtained from the exterior of the car. However, the rate of content removal results in reduction in pressure above the lading. The top of the car compartment must be vented to compensate for material drawn out the bottom of the compartment. Failure to vent the top of the compartment would reduce the efficiency of the vacuum unloading process and even risk damage to the car structure.

Vented hatch covers are known. They represent a successful solution to the prior deficiencies associated with non-vented hatch covers. Such vented hatch covers are available from Salco Products Inc., Lemont, Ill. These configurations are disclosed in commonly assigned U.S. Pat. Nos. 4,819,830 and 5,064,089 and U.S. patent application Ser. No. 11/610, 421, the disclosures of which are incorporated herein by reference. Some of the embodiments of the present invention incorporate a satellite transmission system attached to a vented hatch cover of the type in U.S. Pat. Nos. 4,819,830 and 5,064,089 and U.S. patent application Ser. No. 11/610,421.

Once the hopper cars arrive to their destination, the loaded hopper cars may remain in the railroad yard for several days, or even months, until they are ready to be unloaded. It is typical for the buyer to pay the seller for the cargo only after it has been unloaded from the hopper car. Therefore, when the cargo was unloaded from the hopper car is important to both the seller and the buyer. Since the seller is not involved in the unloading process, the seller would need to rely solely on the buyer to provide him with the date on which the carge was unloaded. Some of the embodiments of the present invention provide the seller with the benefit of receiving a report when the hopper car is being unloaded.

Railroad cars are typically equipped with handbrakes which can be set or engaged when the cars are held in the railroad yard. Occasionally the operator forgets to disengage the handbrake and the railroad car is dragged with the handbrake remain engaged. With the handbrake engaged, the car wheels skid rather than roll. This may cause a flat spot on the wheels and/or ruin the brake shoes. Some of the embodiments of the present invention provide the car owner with the benefit of monitoring the status of the handbrake engagement of the car.

Railroad cars frequently require security mechanisms to preserve the integrity of the contents of the car compartments. Often it is desirable to be aware of instances of unauthorized opening of or entry into such car compartments through the hatch opening. This is particularly true in those situations where theft or contamination of the contents of the compartments is otherwise difficult to ascertain. Such situations exist, for example, where the contents of the car compartment is in bulk or infrequently inventoried, or where even small amounts of certain contaminants are unacceptable. Comprehensive testing for contaminants is usually impractical or prohibitively expensive. Some of the embodiments of the present invention provide the car owner with a security system which monitors the position of the hatch cover and sends a report that the hatch cover has been opened.

BRIEF DESCRIPTION OF THE DRAWINGS

FIG. 8 is a perspective top view of the discharge filter element of the vented hatch cover assembly of FIG. 1.

FIG. 9 is a top view of the discharge filter element of FIG. 8.

FIG. 10 is a sectional side view of the discharge filter element of FIG. 9, as taken along line 10-10 of FIG. 9.

FIG. 11 is a sectional front view of the discharge filter element of FIG. 9, as taken along line 11-11 of FIG. 9.

DETAIL DESCRIPTION OF THE ILLUSTRATED EMBODIMENT

Figure 1:
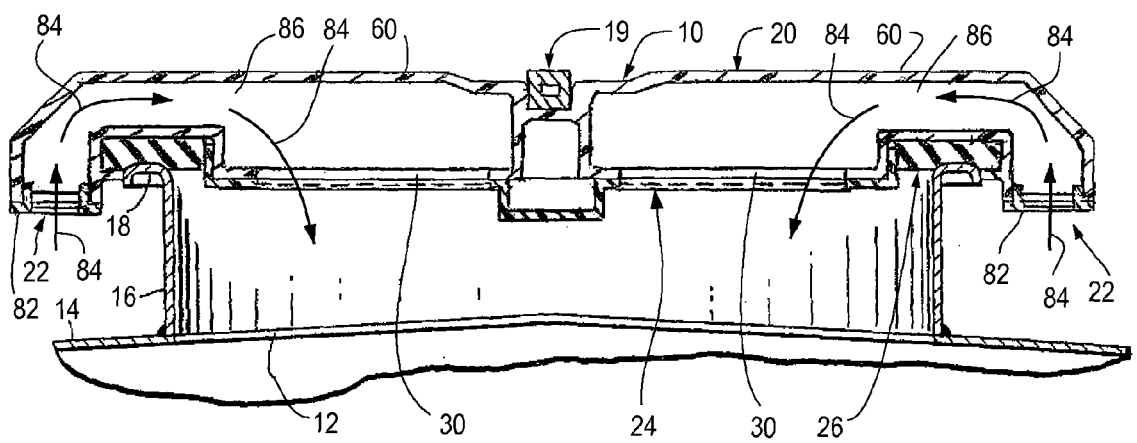
FIG. 1 is a sectional side view of a vented hatch cover assembly according to the present invention in association with a hatch opening.
Figure 2:
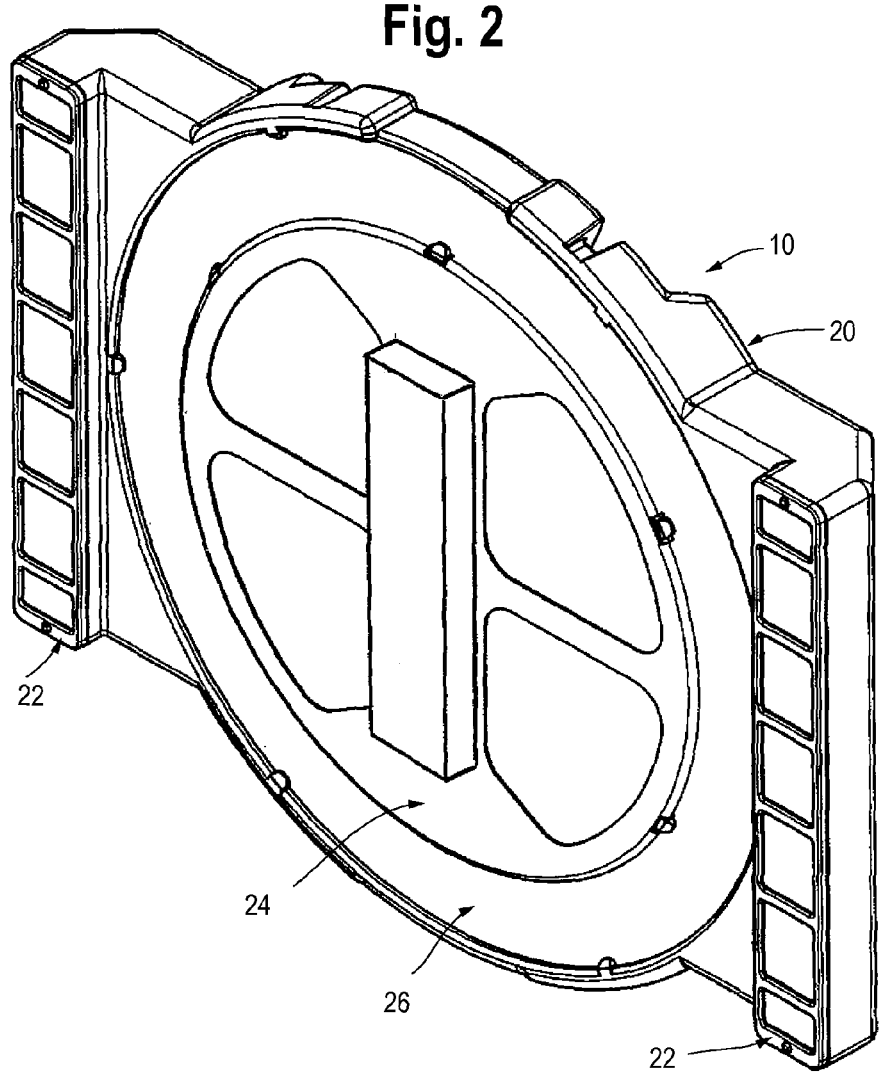
FIG. 2 is a perspective bottom view of the vented hatch cover assembly of FIG. 1.

FIG. 1 illustrates the hatch cover assembly 10 of the present invention in association with a hatch opening or passage 12 in the roof or top 14 of an enclosed or covered railroad hopper car. Hatch opening 12 is defined by an annular ring like coaming 16. The hatch coaming 16 surrounds the opening 12. In this illustration, the top edge of the coaming 16 has a turned-over flange 18. Not all hatch coamings include such a flange.

The hatch cover assembly 10 is comprised of a cover body 20, two side or intake filter elements 22, an interior or discharge filter element 24 and a gasket 26 adapted to engage the coaming 16 to seal the opening 12. With the cover assembly 10 in place on the coaming 16 of a railroad car, air in the atmosphere is free to enter the car. It enters the cover assembly through air intake passages 82. A latch mechanism 19 retains the hatch cover assembly 10 to the coaming 16. The latch mechanism 19 is described in detail in commonly assigned U.S. Pat. No. 5,064,089.

Figure 4:
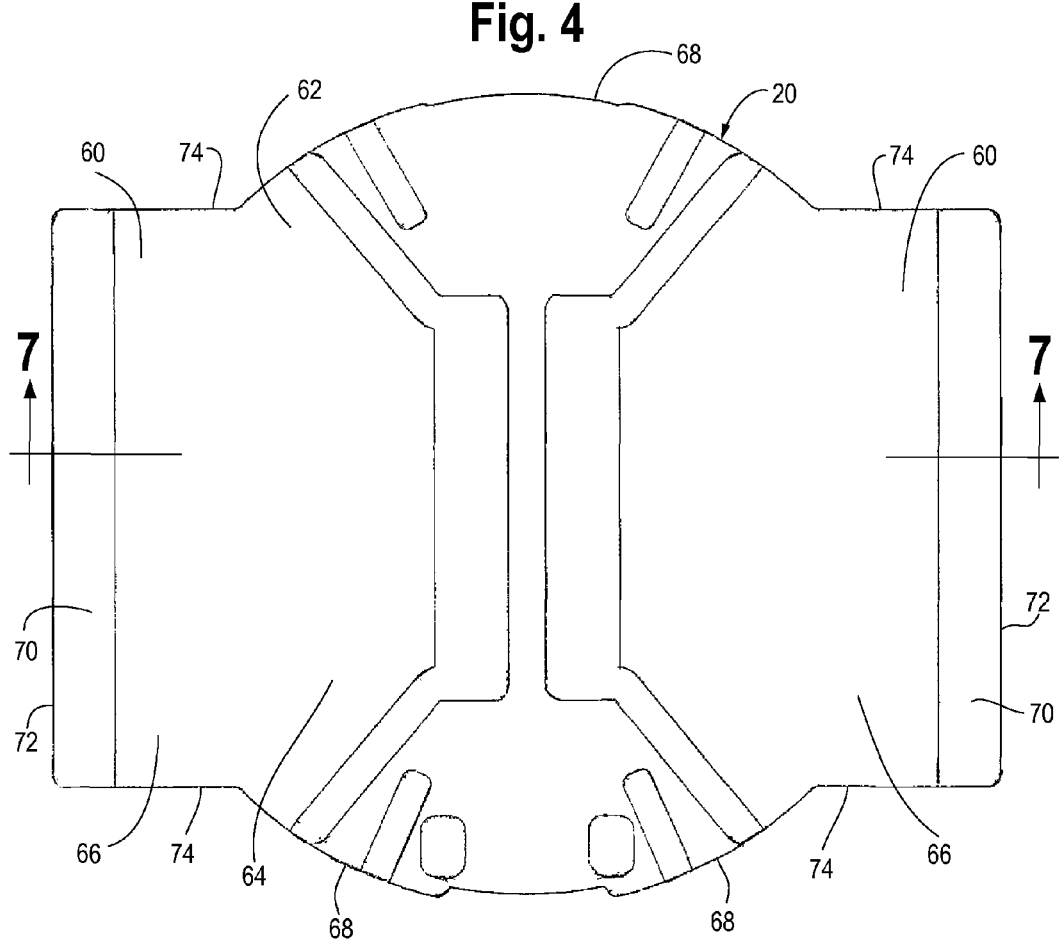
FIG. 4 is a top view of a cover body of the vented hatch cover assembly of FIG. 1.
Figure 5:
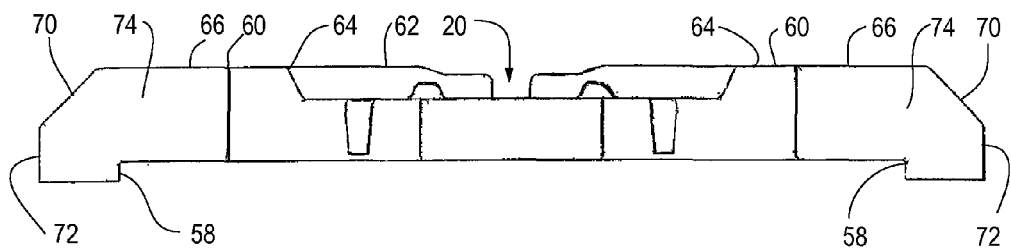
FIG. 5 is a side view of the cover body of FIG. 4.
Figure 6:
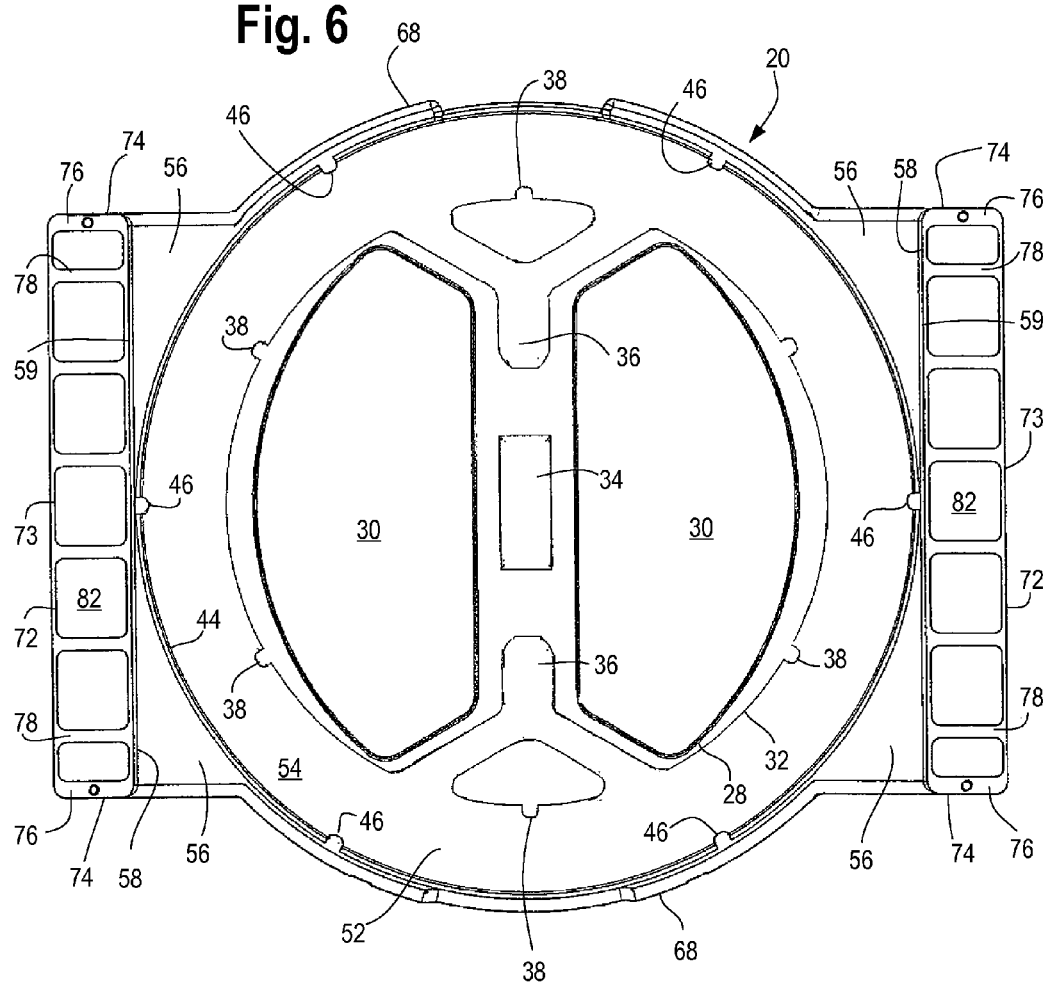
FIG. 6 is a bottom view of the cover body of FIG. 4.
Figure 7:
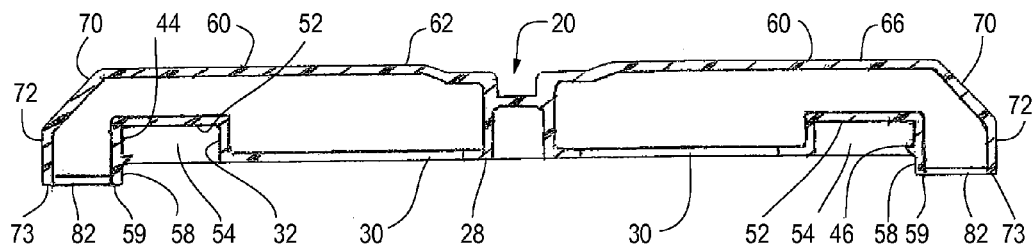
FIG. 7 is a sectional side view of the cover body of FIG. 4, as taken along line 7-7 of FIG. 4.

The cover body 20 is illustrated in detail in FIGS. 4-7. The cover body 20 includes a base 28 and a shell 62. Together, they form duel hoods defining a pair of air discharge passages 30, as illustrated in FIGS. 6-7. The base 28 is generally circular shaped with the circumferentially outer edges defining a circular inner rim 32. The base 28 includes a central rib 34 and two Y-shaped ribs 36 extending upward from the bottom of the base 28 to add rigidity to the cover body 20. It should be noted that the terms "upward" and "downward" are used herein to refer to the direction as the hatch cover assembly normally resides in a closed position on top of an upright railroad hopper car.

Six approximately equally spaced inner clips 38 extend radially outward from the inner rim 32. The cover body 20 further includes a circular outer rim 44 located radially outward a distance from the inner rim 32. Six approximately equally spaced outer clips 46 extend radially inward from the outer rim 44.

A ring-shaped or annular seat 52 connects the outer rim 44 to the inner rim 32. It is intended to overlie the top of the turned-over flange 18 of the coaming 16, when the hatch cover assembly 10 is positioned on the coaming in the closed position as illustrated in FIG. 1. The seat 52 is located above the lowermost edges of the inner and outer rims 32 and 44. The seat 52, along the with inner and outer rims 32 and 44 define an annular pocket 54 for receiving the gasket 26.

As illustrated in FIG. 6, two sets of approximately circumferentially spaced bottom walls 56 extend radially outward from the bottom edge of the outer rim 44 and terminate at a hood inner wall 58. The hood inner wall 58 extends downward from the bottom wall 56 with the lowermost edge 59 of the hood inner wall 58 located below the inner and outer rims 32 and 44, as illustrated in FIG. 7.

The shell 62 includes two hoods 60, defining the double vents, and a generally circular portion 64. Each hood 60 has a extension portions 66 extending radially outward from the generally circular portion 64, beyond the outer rim 44 of the cover body 20, as illustrated in FIGS. 4-5. Each extension portion 66 terminates at a downward sloped wall 70 which connects the extension portion 66 with a hood outer wall 72. The lowermost edge 73 of the hood outer wall 72 extends below the inner and outer rims 32 and 44, as illustrated in FIG. 7. Two flat hood side walls 74 connect the extension portion 66 of the shell 62, the sloped wall 70, and the hood outer wall 72 to the bottom wall 56 and the hood inner wall 58. The extension portion 66, the hood outward wall 72, the two hood side walls 74, the bottom wall 56 and the hood inner wall 58 form one of the hoods 60. Another set of extension portion 66, hood outer wall 72, two hood side walls 74, bottom wall 56 and hood inner wall 58 at the other side of the shell 62 form the other hood 60 of the double vents. Two curved side walls 68 extend from the generally circular portion 64 and merge with the outer rim 44.

The hood outer wall 72, the hood inner wall 58 and the two hood side walls 74 define an air intake passage 82. Air flow from the air intake passage 82 to the air discharge passage 30 is indicated by arrows 84 in FIG. 1. Air enters each hood 60 of the cover body 20 through the air intake passages 82. The air then flows through into a plenum section 86 and exits the cover body 20 through the air discharge passage 30. A similar air flow occurs through the other hood 60 of the cover body 20.

As illustrated in FIG. 6, two end ribs 76 and six intermediate ribs 78 connect each hood outer wall 72 to the hood inner wall 58. The intermediate ribs 78 extends across the air intake passage 82 of the hood 60. The ribs 76 and 78 provide rigidity to the hood outer wall 72 and hood inner wall 58 to prevent the walls 72 and 58 from collapsing toward each other or expanding away from each other.

It will be noted that the construction of the walls direct the air intake passages 82 in a downward direction, when the hatch cover assembly 10 is in the closed position. This construction provides efficient air exchange while presenting an air flow path that reduces entrance of contaminants from the exterior of the hatch cover assembly 10. The air intake passages 82 are radially outboard of the coaming 16 and the air flow through each air passage is sufficiently circuitous that droplets of water, snow or other contaminants are unlikely to be carried into and through the air passages.

While the cover body 20 is described as having a plurality of separate walls and ribs, the cover body is preferably formed as a single part, such as by blow molding, with the walls integral to formed a weather tight enclosure.

Figure 3:
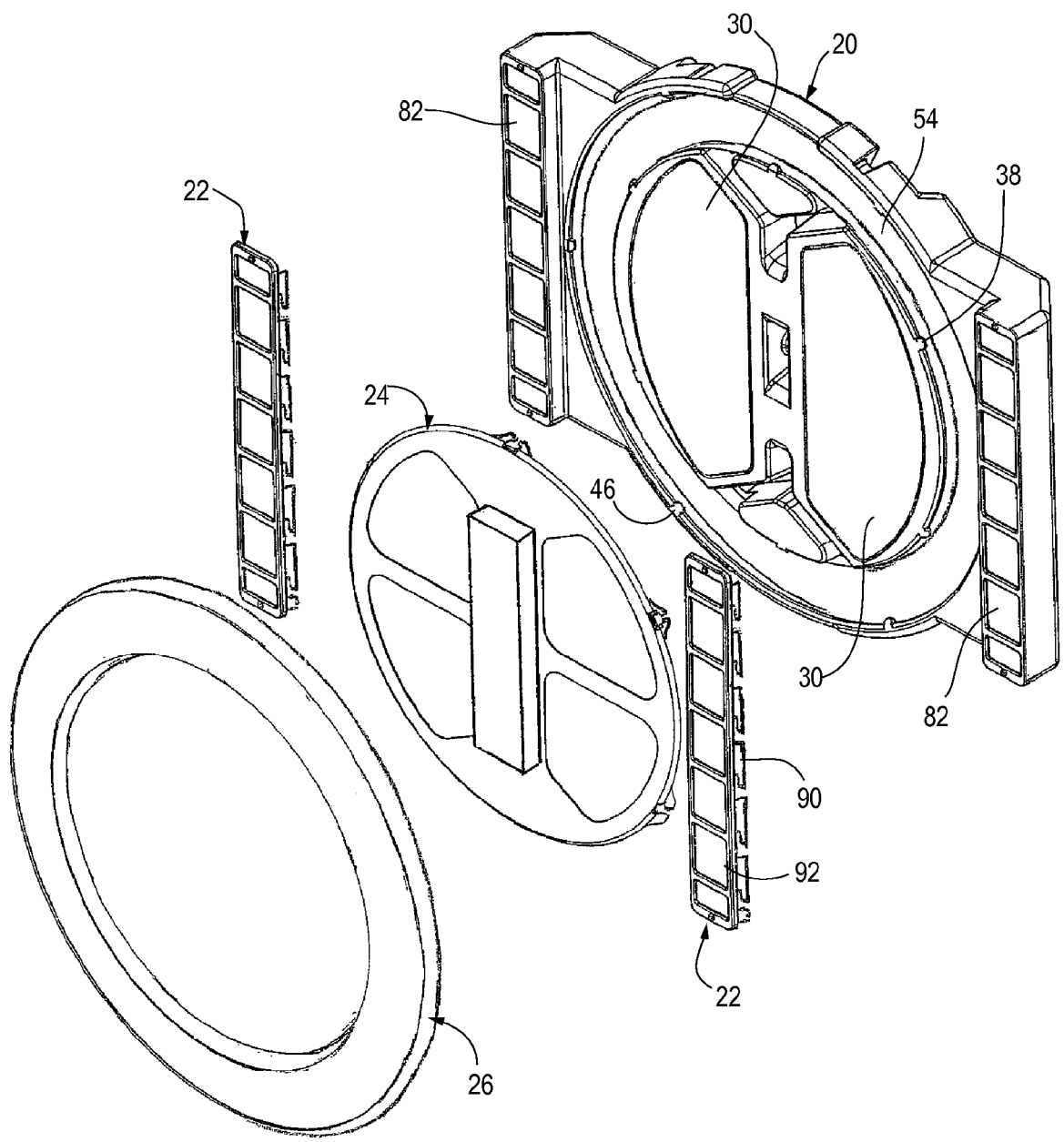
FIG. 3 is an exploded perspective bottom view of the vented hatch cover assembly of FIG. 1, prior to assembling the vented hatch cover assembly components.

A ring-shaped gasket 26 of suitable material is fitted within the pocket 54 defined by the inner rim 32, the outer rim 44 and the seat 52. As illustrated in FIGS. 1 and 3, the gasket 26 contacts the flange 18, when the hatch cover assembly 10 is in the closed position, to provide a weather tight engagement. The installation of the gasket 26 to the cover body 20 is described in detail in commonly assigned U.S. patent application Ser. No. 11/610,421.

The intake filter element 22 is slidably and removably secured to the cover body 20. It prevents, or greatly reduces, outside contaminates from entering the cover body 20. As illustrated in FIGS. 1 and 3, the intake filter element 22 is disposed over the air intake passages 82 of one of the hoods 60, such that the intake filter element 22 is in the flow path of the air entering the air intake passages 82. The intake filter element 22 includes a plurality of latches 90 for engagement with the intermediate ribs 78 of the cover body. Each intake filter element 22 also has a filter material 90. The intake filter element 22 and its installation to the cover body 20 is described in detail in commonly assigned U.S. patent application Ser. No. 11/610,421.

FIGS. 8-12 illustrate in detail the interior or discharge filter element 24. The interior or discharge filter element 24 is removably secured to the cover body 20. It prevents, or greatly reduces, lading from the interior of the car from being entrapped in the underside of the hatch cover assembly 10, from whence subsequence dislodgement could contaminate lading of a different character. The discharge filter element 24 is disposed over the air discharge passages 30, such that the discharge filter element 24 is in the flow path of the air exiting the air discharge passages 30. The discharge filter element 24 has a frame 100. The frame 100 includes an outer annular disk portion 102, a narrow beam portion 104 and a broad beam portion 106 connected to the radially inner edge of the disk portion 102. A rim 108 extends upward from the radially outer edge of the disk portion 102. Four pie shaped discharge filter openings 110 are defined in the frame 100.

Six approximately equally spaced upward extending portions or latches 112 extend upward from the rim 108. Each latch 112 includes two fingers 114 directed toward each other and a narrow gap 116 defined in between the fingers 114. The gap 116 has a width narrower than the width of the inner clip 38 of the cover body 20. The gap 116 extends downward into a slot 118 defined by the lower edges 120 of the fingers 114 and the upper surface 122 of annular disk portion 102. The slot 118 has a width greater than the width of the gap 116. The slot 118 has a height slightly larger than the height of the inner clip 38. The slot 118 has a width slightly larger than the width of the inner clip 38. The number of latches 112 is preferably the same as the number of inner clips 38. While the flame 100 of the discharge filter element 24 is described as having separate disk, beam portions and latches, the frame 100 is preferable formed as a single piece, such as by injection molding, with the disk, beam portions and latches integral.

The discharge filter element 24 also has a filter material 124 over-molded by the frame 100 and occupying the discharge filter openings 110. The filter material 124 for the discharge filter element 24 may be any form of suitable filter media, such as reticulated polyurethane foam or a woven nylon screen.

Figure 12:
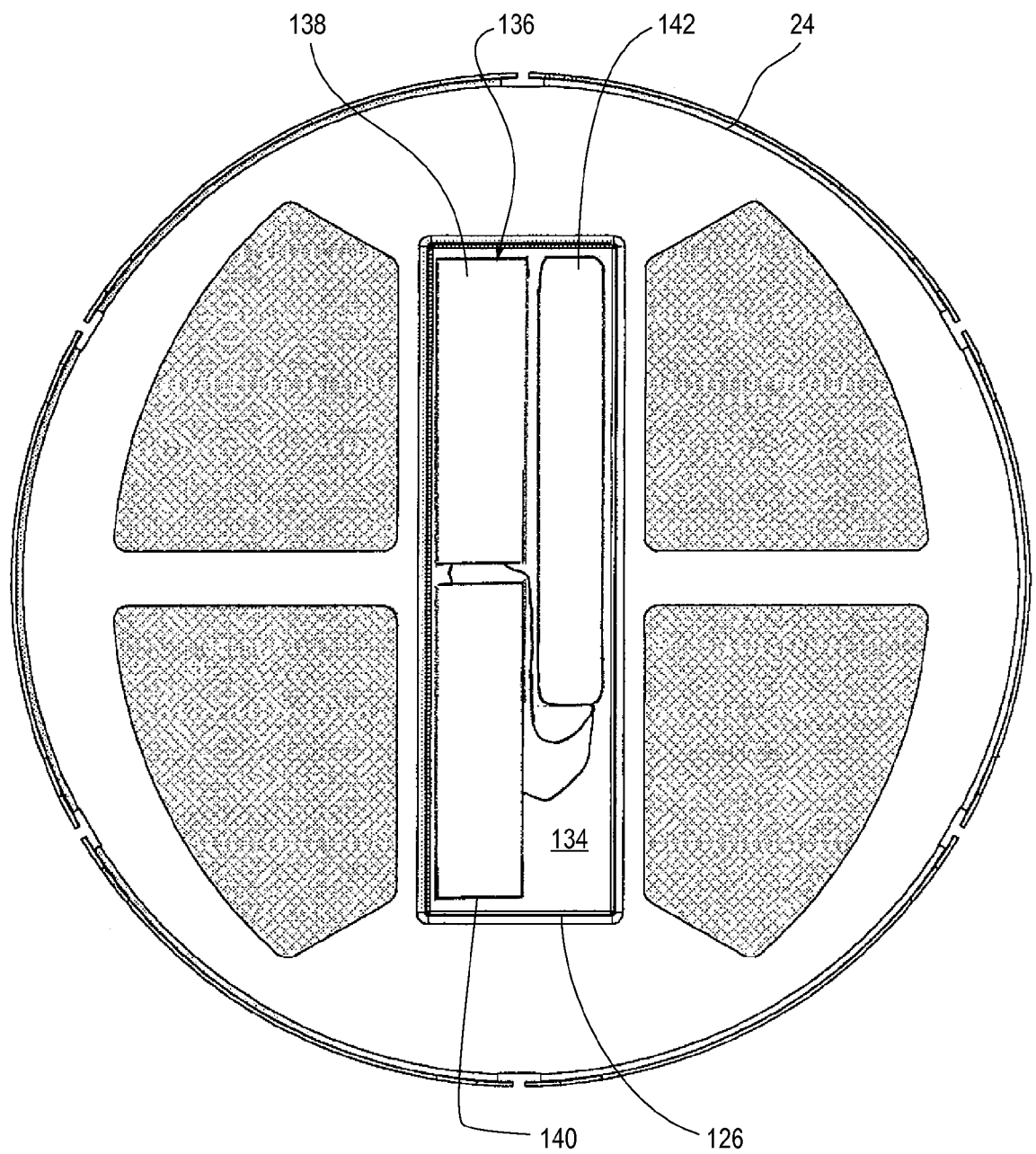
FIG. 12 is a top view of the discharge filter element of FIG. 8 having a satellite transmission assembly situated in the pocket.

The broad beam portion 106 of the frame 100 includes a generally rectangular shaped container 126 extending in a direction opposite the latches 112. The container 126 includes side walls 128 and a bottom 130. The container defines an opening 132 to a pocket 134. The pocket 134 is defined by the interior surfaces of the side walls 128 and bottom 130 of the container 126. The pocket 134 is adapted to allow a satellite transmission system 136 to be situated therein through the opening 132, as illustrated in FIG. 12. The container 126 is preferably formed in conjunction with the remainder of the frame 100 when the frame is being molded, such as by vacuum forming a depression. However, it is also possible to form the container 126 separately and then securing the container to the remainder of the frame by means such as sonic welding or mechanical fasteners.

The satellite transmission system 136 includes a satellite transmitter 138, a wireless receiver 140, and a battery 142. The wireless receiver 140 can be any short-range wireless receiver capable of receiving data from one or more short-range wireless transmitter with limited distortion, such as a wireless receiver using the Bluetooth® wireless technology. The satellite transmission system 136 is programmed to transmit data only at set times of the day or when new data is received by one of the wireless receivers. This non-continuous use of the satellite transmission system allows the system to conserve energy and generally allows a long-life one time use battery to supply sufficient energy to run the system for several years. Should more frequent transmission of data be required, due to either more frequent set time transmissions or large number of wireless transmitters linked to the wireless receiver, a rechargeable battery can be used in the satellite transmission system.

The satellite transmission system 136 is attached to the hatch cover assembly 10 by first inserting the satellite transmission system 136 into the pocket 134 of the discharge filter element 24 through the opening 132. It is preferable that the satellite transmitter 138 is offset to one side as illustrated in FIG. 12 such that the transmitter 138 is not positioned directly beneath the latch mechanism 19. With the satellite transmission system 136 properly situated in the pocket 134, the discharge filter element 24 is secured to the cover body 20 by pressing or pushing the discharge filter element 24 upward towards the base 28 of the cover body 20 with each latch 112 of the discharge filter element 24 aligned with a corresponding inner clip 38. Once the discharge filter element 24 has been secured to the cover body 20, the satellite transmission system 136 is retained by the side walls 128 of the container 126, the bottom 130 of the container 126 and the base 28 of the cover body 20.

Figure 13:
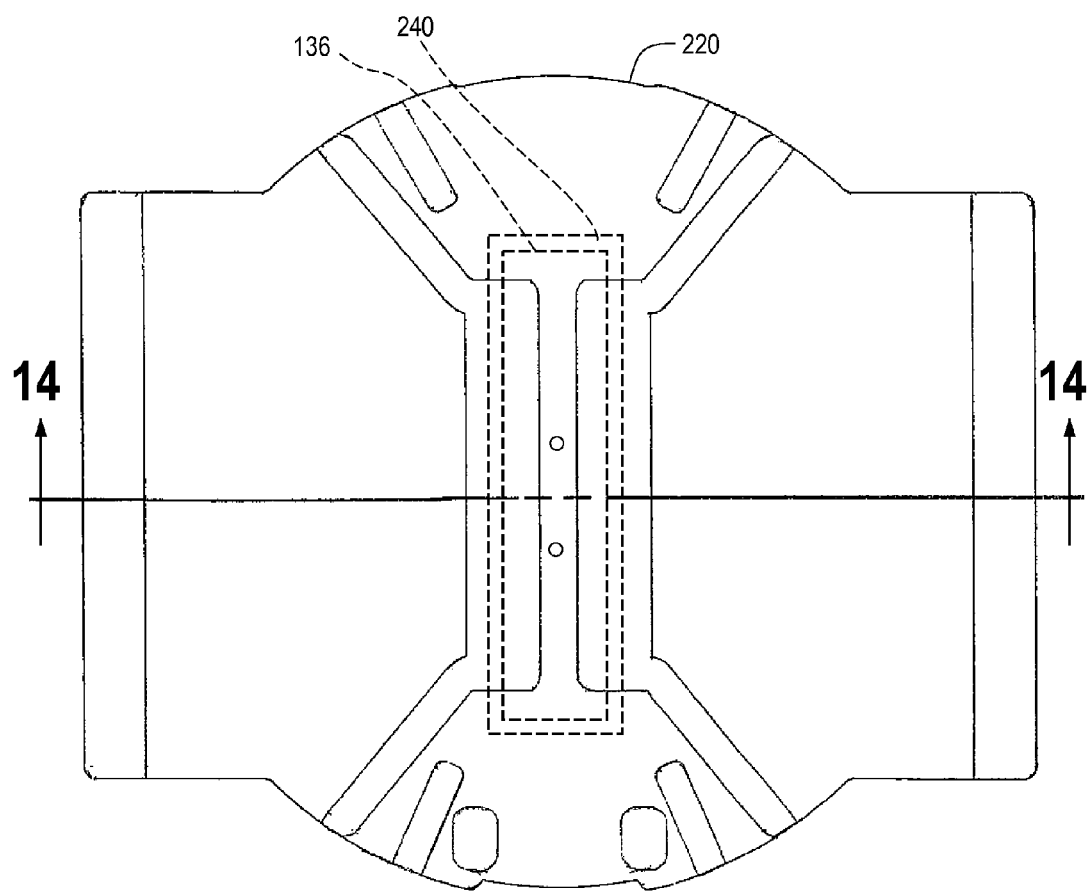
FIG. 13 is a top view of a cover body of an alternative vented hatch cover according to the present invention having a satellite transmission assembly overmolded by the cover body.
Figure 14:
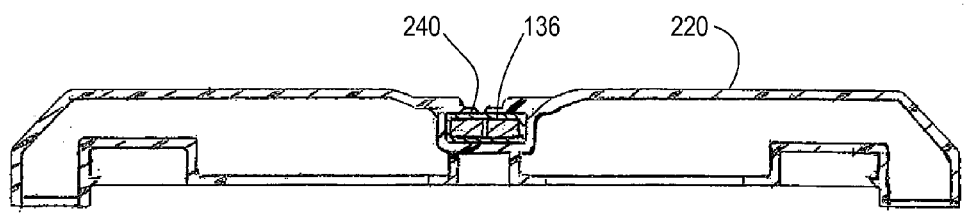
FIG. 14 is a sectional side view of the cover body of FIG. 13, as taken along line 14-14 of FIG. 13.

FIGS. 13 and 14 illustrate the cover body 220 of an alternative vented hatch cover assembly in accordance to the present. The alternative vented hatch cover is similar to the vented hatch cover 10 except the satellite transmission system 136 is attached to the vented hatch cover by overmolding the cover body 220 over the satellite transmission system 136. To assure that the electrical circuits in the satellite transmission system 136 are not damaged during the overmolding process, it is desirable to encase the satellite transmission system 136 in a heat insulating material 240 prior to the overmolding process. The heat insulating material 240 can be a plastic material having a high melting temperature. The heat insulating material 240 can also be a foamed material. The overmolding process can be performed by situating the heat insulating material encased satellite transmission system on a plurality of retractable pins extending from the die for molding the cover body 220. After the cover body 220 has been molded in the die, such as by blow molding, the pins are retracted leaving the satellite transmission system overmolded by the cover body.

Figure 15:
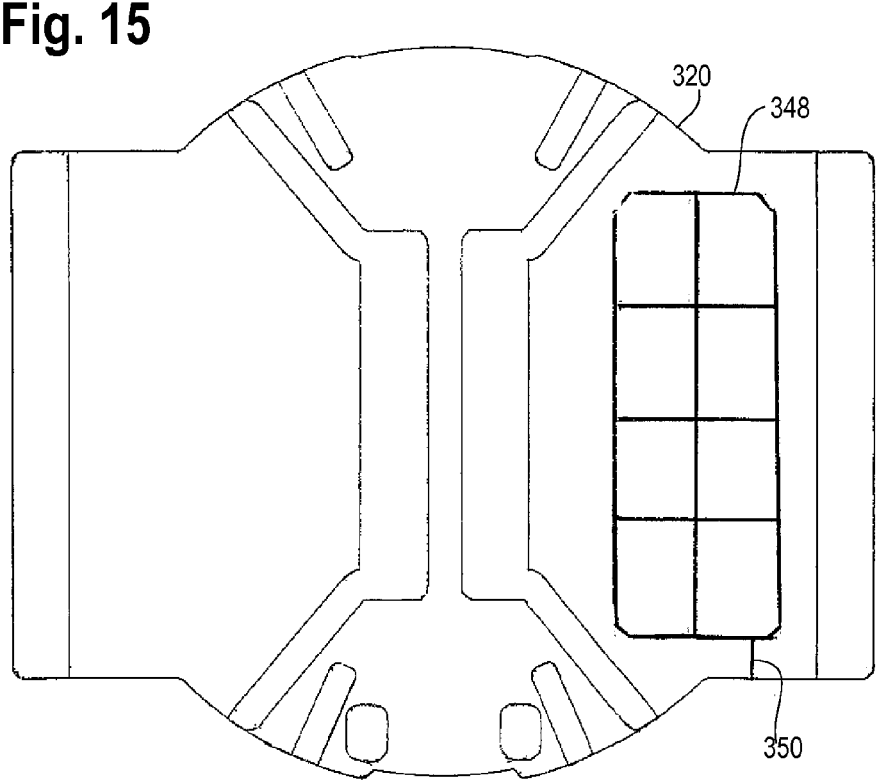
FIG. 15 is a top view of a cover body of another alternative vented hatch cover assembly according to the present invention having solar panels mounted the top of the cover body.
Figure 16:
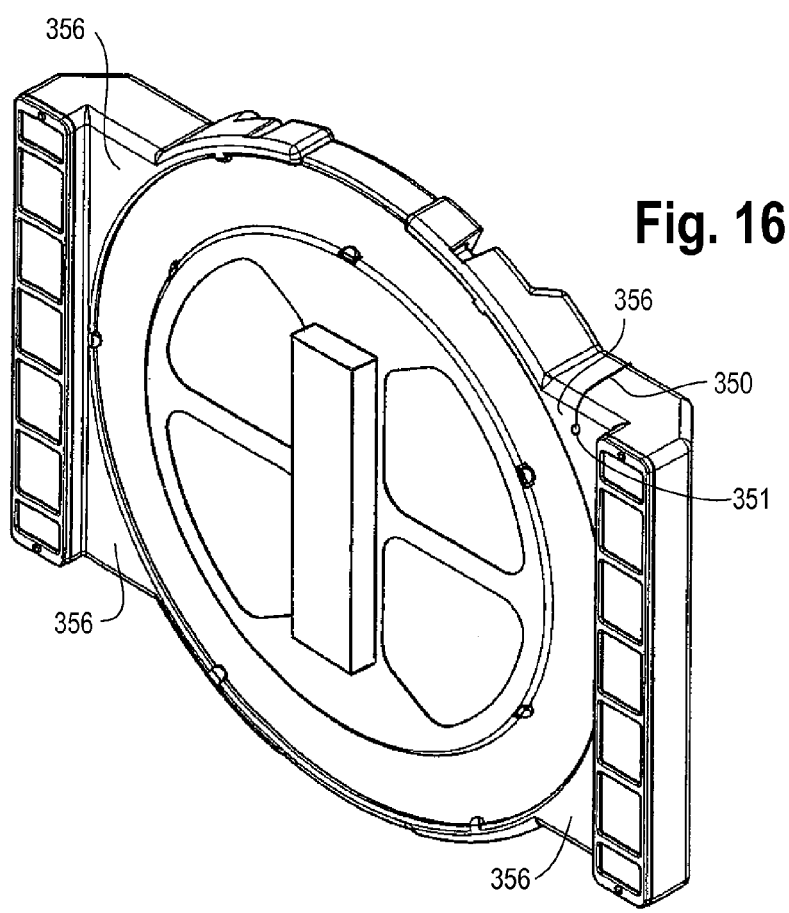
FIG. 16 is a perspective bottom of the cover body of FIG. 15.

FIGS. 15 and 16 illustrate the cover body 320 of another alternative vented hatch cover assembly in accordance to the present invention. The cover body 320 is similar to cover bodies 20 and 220 but includes solar panels 348 mounted on the top of the cover body 320 for recharging a rechargeable battery 142 of the satellite transmission system 136. Like previous embodiments, a satellite transmission system (not shown) is attached to the vented hatch cover assembly. The satellite transmission system can be attached to the vented hatch cover assembly by positioning the satellite transmission system in a pocket defined in the discharge filter element or the satellite transmission system can be attached to the vented hatch cover assembly by overmolding the cover body 320 over the satellite transmission system. For either arrangement for which the satellite transmission system is attached to the vented hatch cover assembly; it is preferable that the wires 350, electrically connecting the solar panels 348 to the rechargeable battery 142 of the satellite transmission system 136, are routed through a hole 351 defined at a bottom surface of the cover body 320, such as one of the bottom walls 356 as illustrated in FIG. 16. By locating the hole 351 at the bottom surface of the cover body 320, the opportunity for water or other undesirable contaminants entering the vented hatch cover assembly 310 and hence the railroad hopper car is greatly reduced.

Figure 17:
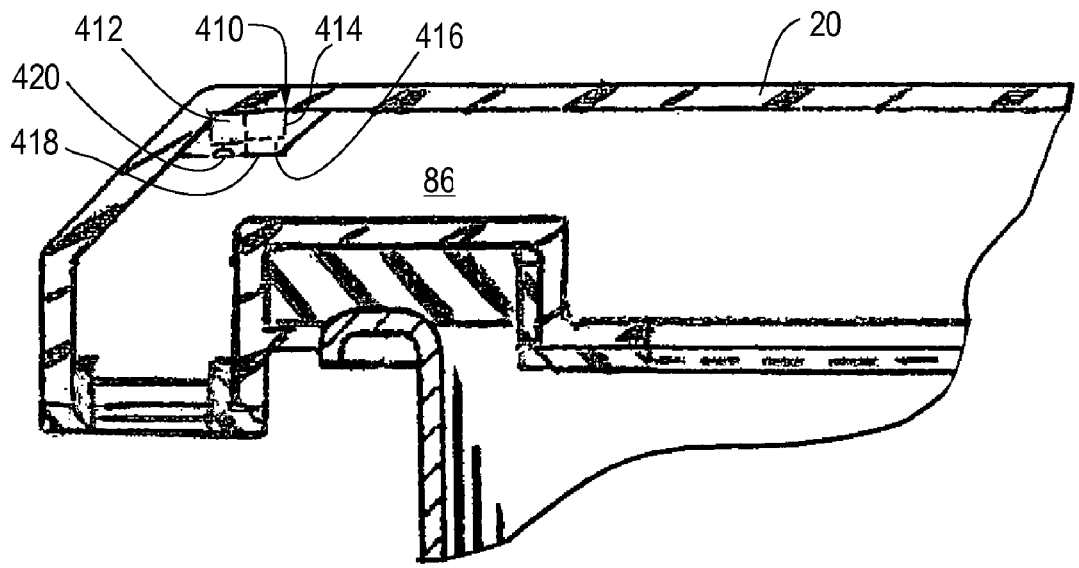
FIG. 17 is a sectional side view of the cover body of FIG. 4 with a pressure sensor mounted in the plenum of the cover body.

In certain situations, it is desirable to know exactly when the cargo in the hopper car has been unloaded. One such situation is when payment for the cargo is made only after it has been unloaded from the hopper car. The cargo is typically unloaded by applying a vacuum conveying line to an outlet gate positioned at the bottom of each car compartment. The rate of content removal from the car compartment results in reduction in pressure above the lading. The reduction in pressure above the lading causes air to flow through the vented hatch cover to compensate for material drawn out the bottom of the compartment. One aspect of the present invention is to attached a pressure sensor assembly 410 to the cover body 20 of the vented hatch cover assembly with at least its sensing unit 420 exposed in the plenum 86 to sense a drop in pressure due to material being removed from the car compartment. Studies by the inventors have shown that the pressure drop is greatest when the last material in the car compartment is being removed. FIG. 17 illustrates the pressure sensor assembly 410 mounted in one of the plenum 86 of the cover body 20. The pressure sensor assembly 410 includes a pressure sensor 412, a wireless transmitter 414 and a battery 416. The pressure sensor 412 can be any type of pressure sensor capable of sensing the pressure drop due to material being removed from the car compartment or at least capable of sensing the large pressure drop when the last material in the car compartment is being removed. One such type of pressure sensor is a commercially available diaphragm pressure sensor which includes a diaphragm which flexes toward the low pressure direction once a pre-determined pressure differential has been reached. The pressure sensor 412 is electrically connected to a wireless transmitter 414. A long-life one time use battery 416 supplies the necessary energy to run the pressure sensor 412 and the wireless transmitter 414. The wireless transmitter 414 can be any short-range wireless transmitter capable of transmitting data from the wireless transmitter to the wireless receiver of the satellite transmission system with limited distortion, such as a wireless transmitter using the Bluetooth® wireless technology. The pressure sensor 412, the wireless transmitter 414 and the battery 416 are mounted to the cover body 20 in such a manner as to limit air flow disruption through the plenum 86. This may require the pressure sensor, the wireless transmitter and the battery to be surrounded by a case 418 wherein only the sensing unit 420 of the pressure sensor 412, such as the diaphragm of a diaphragm pressure sensor, is exposed. Alternatively, majority of the pressure sensor 412, the wireless transmitter 414 and battery 416 can be located outside of the plenum 86 and only the sensing unit 420 of the pressure sensor 412 is located in the plenum 86.

The pressure sensor assembly 410 functions as follows. When the car is being unloaded, the pressure above the lading drops due to material being drawn out the bottom of the compartment. As the pressure drops below a predetermined value, the pressure sensor 412 is triggered, i.e. the diaphragm of the diaphragm pressure sensor flexes toward the low pressure direction. The pressure sensor 412 sends data to the wireless transmitter 414 that the pressure sensor has been trigger. The wireless transmitter 414 sends the data to the wireless receiver 140, which in turn sends the data to the satellite transmitter 138. The data is then transmitted to the seller via satellite allowing the seller to know that the cargo has been unloaded.

Figure 18:
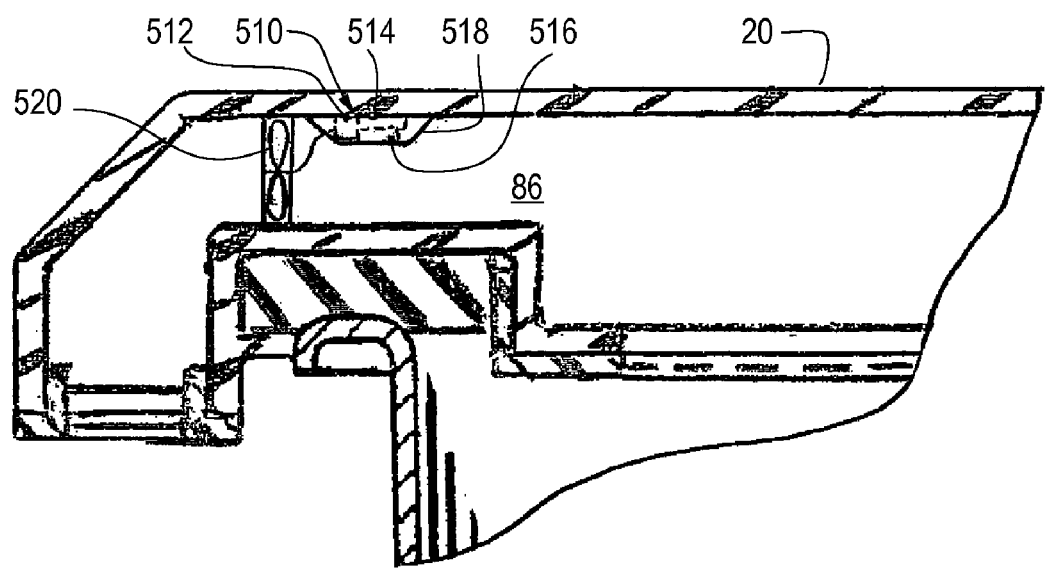
FIG. 18 is a sectional side view of the cover body of FIG. 4 with an air velocity sensor mounted in the plenum of the cover body.
Figure 19:
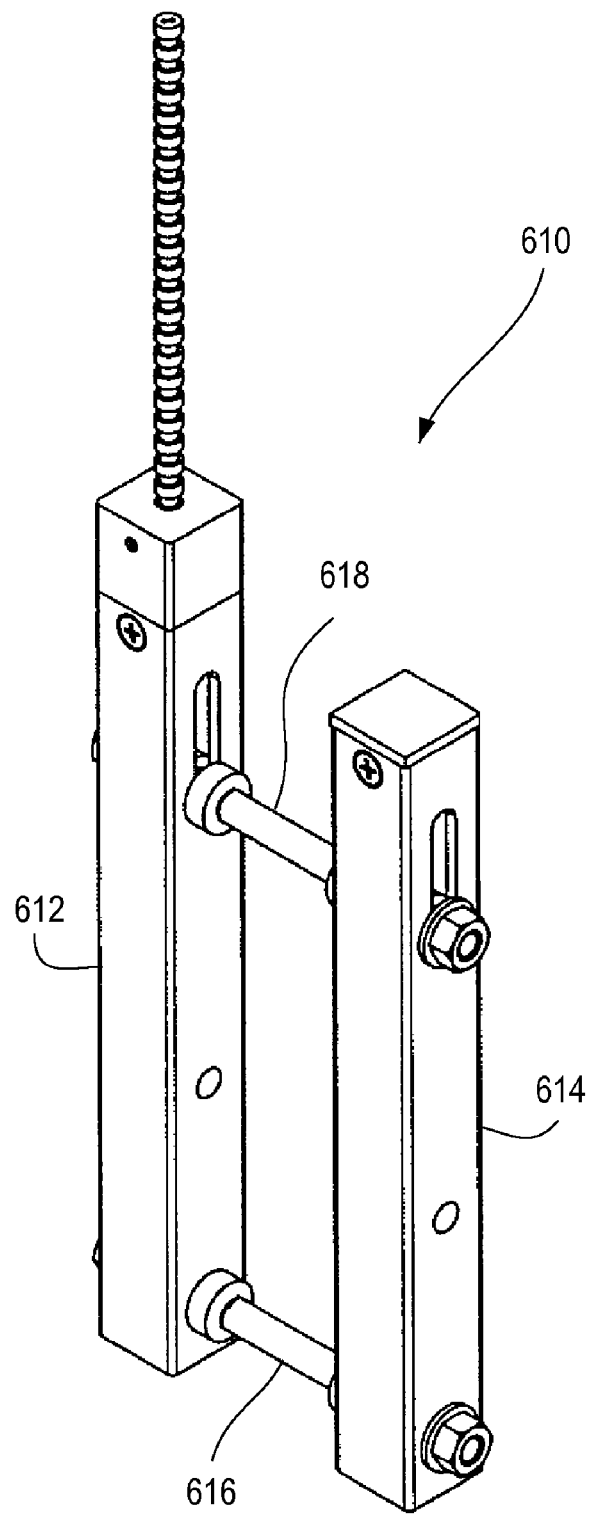
FIG. 19 is a perspective view of a chain tension sensor assembly according to the present invention.
Figure 20:
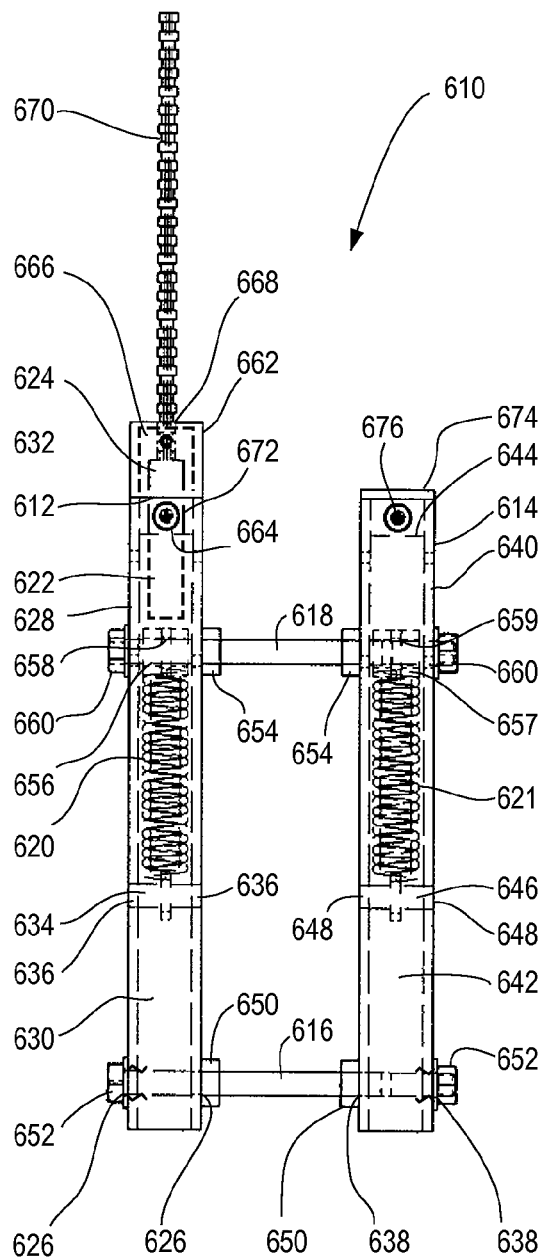
FIG. 20 is a front partial sectional view of the chain tension sensor assembly of FIG. 19.
Figure 21:
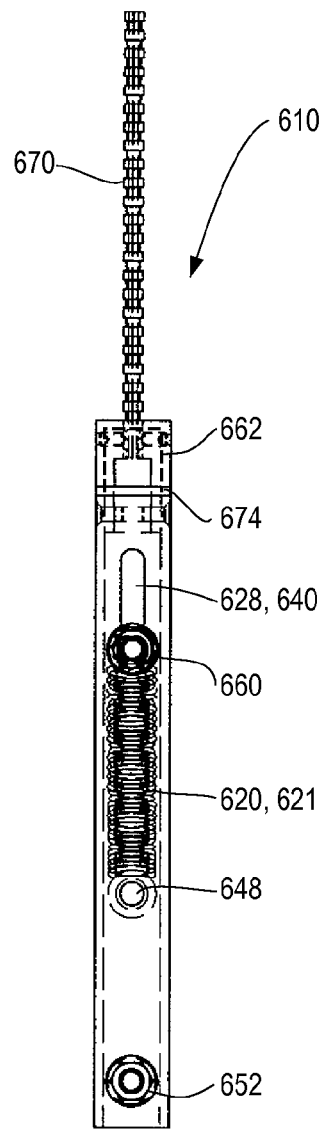
FIG. 21 is a side partial sectional view of the chain tension sensor assembly of FIG. 19.

Rather than sensing pressure drop in the determining that the cargo in the car compartment is being removed, an air velocity sensor assembly with at least its sensing unit 520 exposed in the plenum 86 can be used for determining that the cargo is being removed from the car compartment. FIG. 18 illustrates the air velocity sensor assembly 510 mounted in one of the plenum 86 of the cover body 20. The air velocity sensor assembly 510 includes an air velocity sensor 512, a wireless transmitter 514 and a battery 516. As the cargo is being removed, air flowing through the plenum 86 of the vented hatch cover assembly increases dramatically to compensate for the discharged cargo. After sensing that air velocity through the plenum 86 has increased above a predetermined velocity, the air velocity sensor 512 generates and sends a signal or data to a wireless transmitter 512 indicating that the cargo is being removed. The air velocity sensor 512 is electrically connected to the wireless transmitter 514. The air velocity sensor 512 can be any type of air velocity sensor capable of sensing the velocity, or change in velocity, of the air flowing through the plenum 86 due to material being removed from the car compartment. Examples of such air velocity sensors are commercially available hot wire and rotating vane anemometers. A long-life one time use battery 516 supplies the necessary energy to run the air velocity sensor 512 and the wireless transmitter 514. The wireless transmitter 514 can be any short-range wireless transmitter capable of transmitting data from the wireless transmitter 514 to the wireless receiver 140 of the satellite transmission system 136 with limited distortion, such as a wireless transmitter using the Bluetooth® wireless technology. The air velocity sensor 512, the wireless transmitter 514 and the battery 516 are mounted to the cover body 20 in such as a manner to limit air flow disruption through the plenum 86. This may require the air velocity sensor 512, wireless transmitter 514 and the battery 516 to be surrounded by a case 518 wherein only the sensing unit 520 of the air velocity sensor 512 is exposed. Alternatively, the majority of the air velocity sensor 512, the wireless transmitter 514 and battery 516 can be located outside of the plenum 86 and only the sensing unit 520 of the air velocity sensor 512 is located in the plenum 86.

Railroad cars are typically equipped with handbrakes which can be set or engaged when the cars are held in the railroad yard. The handbrakes usually include a rotatable hand wheel mounted on a shaft which, though a gear train, can rotate a chain drum to wind up a chain which is secured at its end remote from the chain drum to the brake rigging of the railroad car. Example of such a railroad car handbrake mechanism is described in U.S. Pat. No. 4,714,142, the disclosure of which is incorporated herein by reference. Occasionally the operator forgets to disengage the handbrake and the railroad car is dragged with the handbrake remain engaged. With the handbrake engaged, the car wheels skid rather than roll. This may cause a flat spot on the wheels and/or ruin the brake shoes. An aspect of the present invention is to attached a chain tension sensor assembly in between a section of the handbrake chain. FIGS. 19-23 illustrate a chain tension sensor assembly 610 in accordance to the present invention. The chain tension sensor assembly 610 includes a sensor housing 612, an idler housing 614, a stationary cross bar 616, a slidable cross bar 618, two tension springs 620 and 621, a chain tension sensor 622, and a wireless transmitter 624. The sensor housing 614 defines two circular holes 626 and two elongated slots 628.

The sensor housing 612 further defines a hollow space 630 extending through the sensor housing 612 from an opening at the top 632 of the sensor housing 612. A spring support 634 is positioned in the hollow space 630 of the sensor housing 612 in between the circular holes 626 and the elongated slots 628. The spring support 634 includes pins 636 to fix the spring support 634 to the sensor housing 612 so as to prevent it from moving in the up or down direction within the hollow space 630. A tension spring 620 is situated in the hollow space 630 immediately above and attached at one end to the spring support 634.

The idler housing 614 is preferably identical to and interchangeable with the sensor housing 612 to reduce complexity. The idler housing 614 defines two circular holes 638 and two elongated slots 640. The idler housing 614 defines a hollow space 642 extending through the idler housing 614 from an opening 644 at the top of the idler housing 614. A spring support 646 is positioned in the hollow space 642 of the idler housing 614 in between the circular holes 638 and the elongated slots 640. The spring support 646 includes pins 648 to fix the spring support 646 to the idler housing 614 so as to prevent it from moving in the up or down direction within the hollow space 642. A tension spring 621 is situated in the hollow space 642 immediately above and attached at one end to the spring support 646.

It should be noted that for purpose of clarity, the chain tension sensor assembly 610 is shown with its housings 612 and 614 positioned in a vertical plane and the terms "top" and "bottom" have been used in describing the chain tension sensor assembly 610. It will become understood that the "top" and "bottom" configurations are associated with movement of the slidable cross bar 618 within the slots 628 and 640. However, in use, the chain tension sensor assembly 610 can reside in any orientation without regard to horizontal and vertical planes and "top" and "bottom" are only relevant to the illustration herein.

Two radially enlarged washers 650 are slidably mounted on the stationary cross bar 616. Each washer 650 is mounted on the stationary cross bar 616 at a distance from a corresponding end of the stationary cross bar. External threading is formed on the stationary cross bar 616 in between the mounting position of each washer 650 and the corresponding end of the stationary cross bar. One end of the stationary cross bar 616 is inserted through the circular holes 626 of the sensor housing 612 until one of the washers 650 abuts the sensor housing 612 with at least a portion of the threading extending beyond the sensor housing. The other end of the stationary cross bar 616 is inserted through the circular holes 638 of the idler housing 614 until the other washer 650 abuts the idler housing 614 with at least a portion of the threading extending beyond the idler housing. Two nuts 652 are used to secure the sensor housing 612 and the idler housing 614 to the stationary cross bar 616.

The slidable cross bar 618 is preferably identical to and interchangeable with the stationary cross bar 616 to reduce complexity. Two radially enlarged washers 654 are slidably mounted on the slidable cross bar 618. Each washer 654 is mounted on the slidable cross bar 618 at a distance from a corresponding end of the stationary cross bar. External threading is formed on the slidable cross bar in between the mounting position of each washer and the corresponding end of the slidable cross bar. A sleeve 656 having a bore 658 is inserted into the hollow space 630 of the sensor housing 612 immediately above and attached to the corresponding tension spring 620. Likewise, a sleeve 657 having a through bore 659 is inserted into the hollow space 642 of the idler housing 614 immediately above and attached to the corresponding tension spring 621. One end of the slidable cross bar 618 is inserted through the slots 628 of the sensor housing 612 and the bore 658 of the corresponding sleeve 656 until one of the washers 654 abuts the sensor housing 612 with at least a portion of the threading extending beyond the sensor housing. The other end of the slidable cross bar 618 is inserted through the slots 640 of the idler housing 614 and the bore 659 of the corresponding sleeve 657 until the other washer 654 abuts the idler housing 614 with at least a portion of the threading extending beyond the idler housing. Two nuts 660 are used to secure the sensor housing 612 and the idler housing 614 to the slidable cross bar 618.

The tension spring 620, located in the hollow space 630 of the sensor housing 612, is attached at its bottom end to the corresponding spring support 634 and attached at its top end to the corresponding sleeve 656 surrounding the slidable cross bar 618. Likewise, the tension spring 621, located in the hollow space 642 of the idler housing 614, is attached at its bottom end to the corresponding spring support 646 and attached at its top end to the corresponding sleeve 657 surrounding the slidable cross bar 618. Since the tension springs 620 and 621 are in tension, the springs 620 and 621 pull the slidable cross bar 618 downward toward the spring supports 634 and 646. Furthermore, since the slidable cross bar 618 is located in slots 628 and 640 defined in the sensor housing 612 and idler housing 614, the slidable cross bar 618 is capable of traveling up along the slots 628 and 640 from a neutral position wherein the slidable cross bar 618 is located at the bottom of the slots 628 and 640 to a tension position wherein the slidable cross bar 618 is located a given distance up along the slots 628 and 640 from the neutral position.

The chain tension sensor 622 is positioned in the hollow space 630 of the sensor housing 612 immediately above the sleeve 656 surrounding the slidable cross bar 618. The chain tension sensor 622 is adapted to sense movement of the slidable cross bar 618 relative to the sensor housing 612. The chain tension sensor 622 can be any type of sensor capable of measuring displacement of the slidable cross bar 618 from the neutral position to the tension position. Alternatively, the chain tension sensor 622 can be any type of sensor capable of triggering or untriggering upon the slidable cross bar 618 traveling from the neutral position to the tension position.

A sensor housing cap 662 is joined to the sensor housing 612 and covers the opening 632 to the hollow space 630 of the sensor housing 612. Two screws 664 secure the sensor housing cap 662 to the sensor housing 612. The sensor housing cap 662 defines a hollow space 666 extending through the sensor housing cap 662 from a circular opening 668 at the top of the sensor housing cap 662. Upon the sensor housing cap 662 secured to the sensor housing 612, the hollow space 666 of the sensor housing cap 662 and the hollow space 630 of the sensor housing 612 are open to each other and together form one hollow space 630 and 666.

The wireless transmitter 624 is positioned in the hollow space 630 and 666 of the sensor housing 612 and sensor housing cap 662 with the antenna 670 of the wireless transmitter 624 extending through the circular opening 668 defined at the top of the sensor housing cap 662. The wireless transmitter 624 can be any short-range wireless transmitter capable of transmitting data from the wireless transmitter 624 to the wireless receiver 140 of the satellite transmission system 136 with limited distortion, such as a wireless transmitter using the Bluetooth® wireless technology. A long-life one time use battery 672 supplies the necessary energy to run the chain tension sensor 622 and the wireless transmitter 624.

An idler housing cap 674 is joined to the idler housing 614 and covers the opening 644 to the hollow space 642 of the idler housing 614. Two screws 676 secure the idler housing cap 674 to the idler housing 614.

Figure 22:
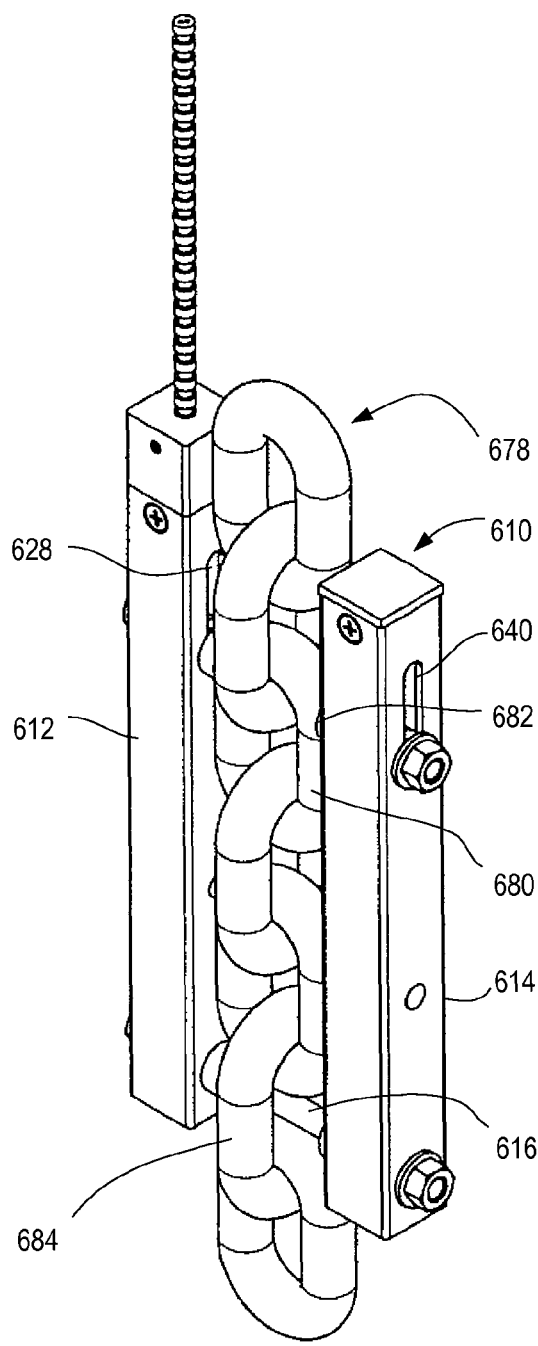
FIG. 22 is a perspective view of the chain tension sensor assembly of FIG. 19 attached to a section of the handbrake chain.
Figure 23:
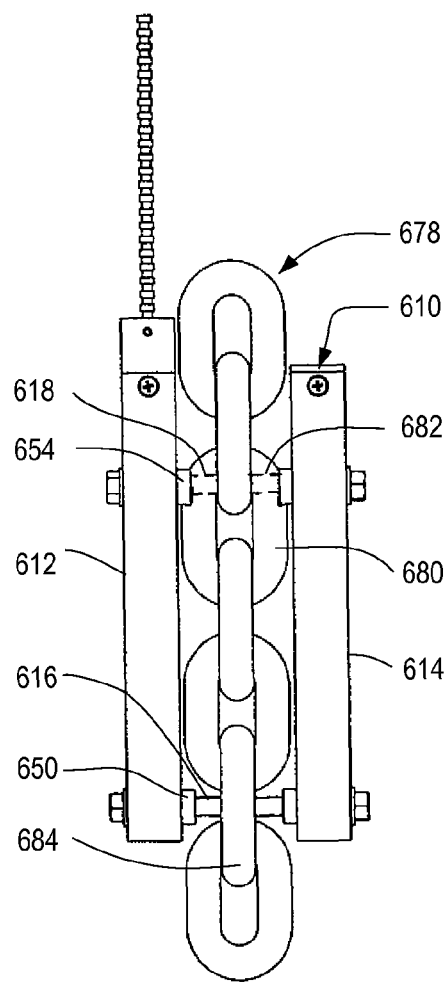
FIG. 23 is a front view of the chain tension sensor assembly of FIG. 19 attached to a section of the handbrake chain.

FIGS. 22 and 23 illustrate the chain tension sensor assembly 610 attached to a section of the handbrake chain 678 secured to the brake rigging of the railroad car. At least one link 680 of the chain 678 is bored to define two through holes 682 at opposite sides of the link 680. The slidable cross bar 618 is inserted through the holes 682 of the link 680. The washers 654 associated with the slidable cross bar 618 are then placed on the slidable cross bar 618 at a position outwardly of the link 680 thus sandwiching the link 680 in between the two washers 654. The ends of the slidable cross bar 618 are then inserted through the slots 628 and 640 of the sensor housing 612 and idler housing 614 in the manner described previously to complete the chain tension sensor assembly 610. The stationary cross bar 616 is inserted through another link 684 of the chain 678. The washers 650 associated with the stationary cross bar 616 are placed on the stationary bar 616. The ends of the stationary cross bar 616 are then inserted through the circular holes 626 and 638 of the sensor housing 612 and idler housing 614 in the manner described previously to complete the chain tension sensor assembly 610. The distance between the slidable cross bar 618 and the stationary cross bar 616 should be such that when the chain 678 is slack, the slidable cross bar 618 is at its neutral position; and when the chain 678 is in tension, the slidable cross bar 618 is at its tension position.

The chain tension sensor assembly 610 functions as follows. When the handbrake is at the disengaged position, the chain 678 secured to the brake rigger is slack, i.e. not in tension. Without the chain in tension, the tension springs 620 and 621 of the chain tension sensor assembly 610 pull the slidable cross bar 618 to its neutral position. To engage or set the handbrake, the chain 678 is put in tension, thus, taking up any slack in the chain. As the chain 678 is put in the tension, the link 680 attached to the slidable cross bar 618 pulls the slidable cross bar 618 to its tension position. As the slidable cross bar 618 travels to the tension position from the neutral position, the chain tension sensor 622 senses the movement or displacement of the slidable cross bar 618 and sends a signal or data to the wireless transmitter 624 that the slidable cross 618 has been moved to its tension position. The wireless transmitter 624 sends the data to the wireless receiver 140, which in turn sends the data to the satellite transmitter 138. The data is then transmitted to the car owner via satellite allowing the owner to know whether the handbrake is engaged or disengaged. This data, in junction with a global positioning system (GPS) tracking movement of the railroad, is able alert the car owner that the car is being dragged with the handbrake still engaged.

Figure 24:
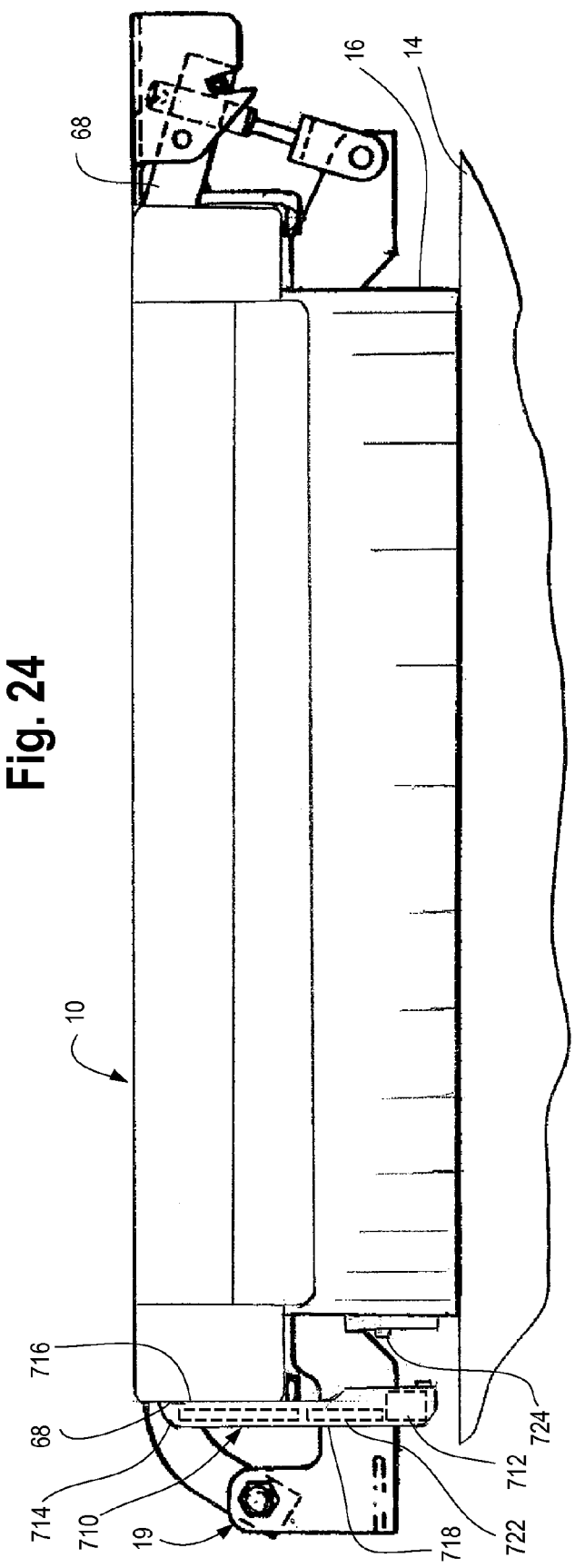
FIG. 24 is a front view of a vented hatch cover assembly having a hatch cover position sensor in accordance to the present invention to monitor the position of the vented hatch cover assembly.

Railroad car frequently require security mechanisms to preserve the integrity of the contents of the car compartments. Often it is desirable to be aware of instances of unauthorized opening of or entry into such car compartments through the hatch opening. An aspect of the present invention is to utilize a hatch cover position sensor assembly which monitors the position of the hatch cover and sends a report that the hatch cover has been opened. FIG. 24 illustrates a hatch cover position sensor assembly 710 in accordance to the present invention. The hatch cover position sensor assembly 710 includes a hatch cover position sensor 712, a sensor mount 714, and a wireless transmitter 716.

The hatch cover position sensor 712 can be any sensor capable of sensing a movement in position. One such sensor is a proximity switch. The sensor mount 714 is fixed to one of the curved side walls 68 of the cover body 20 of the vented hatch cover assembly 10. The sensor mount 714 includes a downwardly extending portion 718, extending below the side wall 68. The hatch cover position sensor 712 is mounted to the downwardly extending portion 718 of the sensor mount 714. The hatch cover position sensor 712 is electrically connected to the wireless transmitter 716. The wireless transmitter 716 can be any short-range wireless transmitter capable of transmitting data from the wireless transmitter 716 to the wireless receiver 140 of the satellite transmission system 136 with limited distortion, such as a wireless transmitter using the Bluetooth® wireless technology. A long-life one time use battery 722 is also mounted to the sensor mount 716 to supply the necessary energy to run the hatch cover position sensor 712 and the wireless transmitter 716.

In applications in which a proximity switch is used as the hatch cover position sensor 712, a magnet 724 is mounted on the coaming 16 at a location upward and radially inward of the proximity switch 712 when the hatch cover assembly 10 is in the closed position. When the hatch cover assembly 10 is being opened, the proximity switch 712 is triggered as it is brought closer to the magnet 724. A data indicating that the proximity switch 712 has been trigger is then transmitted to the wireless transmitter 716. The wireless transmitter 716 sends the data to the wireless receiver 140, which in turn sends the data to the satellite transmitter 138. The data is then transmitted to the car owner via satellite allowing the owner to know that the hatch cover assembly 10 has been opened.

While a preferred form of the invention has been shown and described, it will be understood that alterations to the illustrated embodiments could be made without departing from the scope of the following claims.

We claim:

1. A hatch cover for a railroad car comprising;
   a hatch cover assembly including a cover body;
   a wireless receiver for receiving data from a wireless transmitter;
   a satellite transmitter for transmitting said data to a satellite; and
   wherein said wireless receiver and said satellite transmitter are attached to said hatch cover assembly.

2. The hatch cover for a railroad car as claimed in claim 1 wherein said cover body has a plurality of walls defining an air intake passage and an air discharge passage, said hatch cover assembly further includes a discharge filter element disposed over said air discharge passage, said discharge filter element defines a pocket, said wireless receiver and said satellite transmitter are situated in said pocket.

3. The hatch cover for a railroad car as claimed in claim 2 wherein said discharge filter element defines an opening to said pocket, said opening is directed towards said cover body.

4. The hatch cover for a railroad car as claimed in claim 2 wherein said discharge filter element has a frame; said frame includes an outer annular disk portion, a narrow beam portion and a broad beam portion connected to the disk portion; said broad beam portion includes a container defining said pocket.

5. The hatch cover for a railroad car as claimed in claim 2 further comprising a battery situated in said pocket defined in said discharge filter element.

6. The hatch cover for a railroad car as claimed in claim 5 wherein said battery is a rechargeable battery.

7. The hatch cover for a railroad car as claimed in claim 6 further comprising a solar panel attached to said cover body of said hatch cover assembly for charging said rechargeable battery.

8. The hatch cover for a railroad car as claimed in claim 7 further comprising a wire electrically connecting said solar panel to said rechargeable battery, said cover body defines a hole at a bottom surface of the cover body, said wire routed through said hole.

9. The hatch cover for a railroad car as claimed in claim 1 wherein said wireless receiver and said satellite transmitter are overmolded by said cover body.

10. The hatch cover for a railroad car as claimed in claim 9 wherein said wireless receiver and said satellite transmitter are encased by a heat insulating material.

11. The hatch cover for a railroad car as claimed in claim 10 wherein said heat insulating material is a foamed material.

12. The hatch cover for a railroad car as claimed in claim 1 wherein said cover includes a wireless transmitter and cover body has a plurality of walls defining an air intake passage, an air discharge passage and a plenum extending from said intake passage to said air discharge passage; said system further comprising a pressure sensor having a sensing unit situated in said plenum, said wireless transmitter for transmitting data from said pressure sensor to said wireless receiver.

13. The hatch cover for a railroad car as claimed in claim 1 wherein said cover includes a wireless transmitter and cover body has a plurality of walls defining an air intake passage, an air discharge passage and a plenum extending from said intake passage to said air discharge passage; said system further comprising an air flow sensor having a sensing unit situated in said plenum, said wireless transmitter configured to transmit data from said air flow sensor to said wireless receiver.

14. The hatch cover for a railroad car as claimed in claim 1 further comprising a sensor attached to said hatch cover, and a wireless transmitter configured to transmit information from said sensor to said wireless receiver.

15. The hatch cover for a railroad car as claimed in claim 14 wherein said sensor is a pressure sensor having a sensing unit situated in a plenum of a vented hatch cover.

16. The hatch cover for a railroad car as claimed in claim 15 wherein said pressure sensor is a diaphragm pressure sensor.

17. The hatch cover for a railroad car as claimed in claim 14 wherein said sensor is an air velocity sensor having a sensing unit situated in a plenum of a vented hatch cover.

18. The hatch cover for a railroad car as claimed in claim 17 wherein said air velocity sensor is a rotating vane anemometer.

19. The hatch cover for a railroad car as claimed in claim 14 wherein said sensor is hatch cover position sensor attached to a hatch cover.

20. The hatch cover for a railroad car as claimed in claim 19 further comprising a magnet mounted on the railroad car and wherein said hatch cover position sensor is a proximity switch.

* * * * *